Aug. 14, 1923.

L. W. CLOSE

VEHICLE

Filed Nov. 27, 1922

1,464,922

Inventor
Lyman W. Close
By B. M. Kent,
Attorney

Patented Aug. 14, 1923.

1,464,922

UNITED STATES PATENT OFFICE.

LYMAN W. CLOSE, OF TOLEDO, OHIO, ASSIGNOR TO THE BOCK BEARING COMPANY, OF TOLEDO, OHIO, A CORPORATION OF OHIO.

VEHICLE.

Application filed November 27, 1922. Serial No. 603,450.

*To all whom it may concern:*

Be it known that I, LYMAN W. CLOSE, a citizen of the United States, and a resident of Toledo, county of Lucas, State of Ohio, have invented certain new and useful Improvements in Vehicles, of which the following is a specification.

This invention relates to demountable wheels for vehicles and more particularly to a demountable wheel for mine cars and the like.

It is one of the objects of the invention to provide a wheel that is supported on anti-friction bearings and which may be readily demounted without disturbing the adjustment of the bearings.

A further object of the invention is to provide a demountable wheel construction for a wheel that is rotatably mounted on a journal, the construction permitting the removal of the wheel without disturbing the journal bearing and the construction also insuring accurate and positive positioning of the wheel.

Figure 1:
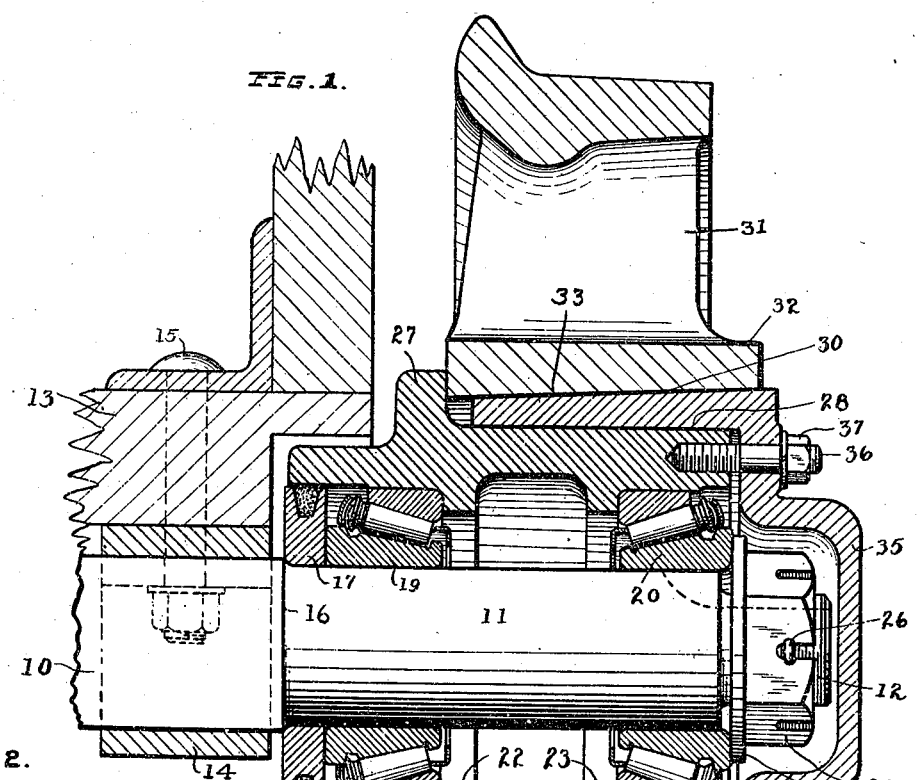
Figure 2:
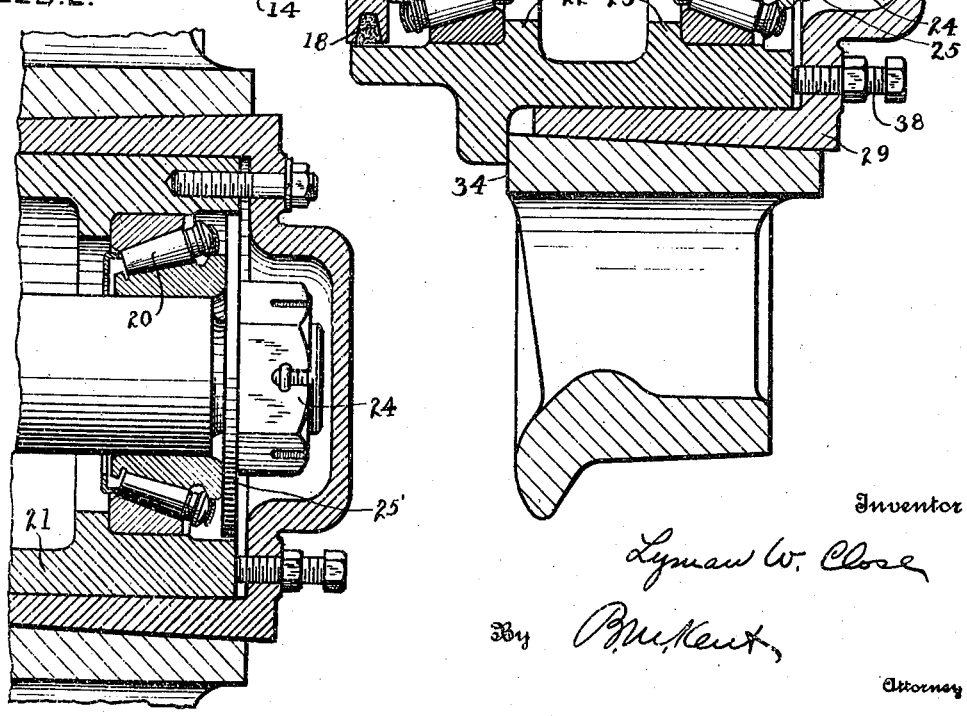

Other objects and the features of novelty will be apparent from the following description, taken in connection with the accompanying drawings, of which:

Fig. 1 is an axial section through a wheel and its mounting, embodying my invention; and Fig. 2 is a fragment of Fig. 1 with a slight modification.

Referring to the drawings, 10 indicates an axle shaft of a mine car or vehicle for which the invention is adapted for use, this shaft having a journal 11 and having its outer end reduced in diameter and threaded as indicated at 12. A portion of the frame of the vehicle is indicated at 13, and the shaft 10 is secured thereto by means of a box 14 and bolts 15, all of which may be of the ordinary construction. At the inner end of the journal 11 there is a shoulder 16 against which a washer 17, having a peripheral groove for a felt packing 18, is positioned. An anti-friction bearing 19, and preferably a tapered roller bearing such as is illustrated, is mounted on the journal 11, in abutting relation to the washer 17. Another anti-friction bearing 20, preferably of the same type as the bearing 19, is arranged on the outer end of the journal 11, in opposition to the bearing 19, and a sleeve 21 is carried by the bearings 19 and 20 and is provided, on its interior, with collars 22 and 23 adapted to engage with the bearings 19 and 20, respectively. The bearings 19 and 20 and the sleeve 21 are secured on the axle by means of a nut 24 and a washer 25, the spacing of the bearings being maintained by the collars 22 and 23. The nut 24 may be secured by an ordinary cotter pin 26.

The sleeve 21 has an outer flange 27 adjacent its inner end and, outwardly of said flange, a cylindrical exterior surface 28 on which there is fitted a sleeve or bushing 29 having a conical outer surface 30 tapering inwardly. A wheel 31, having a hub 32 provided with a conical bore 33, fits upon the conical surface 30 of the sleeve 29 with the inner end 34 of the hub abutting the outer side of the flange 27 so as to locate the wheel in an axial direction.

The sleeve or bushing 29 is provided with an end wall 35 to cover the outer end of the axle and conceal the bearings 19 and 20 and exclude dirt therefrom as well as to retain lubricant in the interior spaces. A plurality of studs 36 are secured in the sleeve 21 and nuts 37 on these studs serve to draw the sleeve 29 inwardly to secure the wheel 31 in position and also to secure the sleeve 29 on the sleeve 21. A plurality of bolts 38 may be provided for the purpose of withdrawing the sleeve 29 when it is desired to remove the wheel. These bolts 38 have threaded engagement with the end wall 35 of the sleeve 29 and, at their inner ends, bear against the outer end of the sleeve 21 and, when screwed inwardly, they forcibly withdraw the sleeve 29. The studs 36 and the bolts 38 are preferably spaced symmetrically around the end wall 35 of the sleeve 29.

From the foregoing it will be noted that the adjustment of the bearings 19 and 20 is secured and maintained by the nut 24 and the sleeve 21 and that the removal of the sleeve 29 in no wise affects the adjustment. When the sleeve 29 is withdrawn the wheel 31 is entirely free from the sleeve 21 and, in this way, a broken or worn wheel may be readily replaced.

In the modification illustrated in Fig. 2, the parts are substantially the same as illustrated in Fig. 1, with the exception that the washer 25′, under the nut 24, is made larger and is arranged within the outer end of the sleeve 21 so as to closely fit the bore thereof and exclude dirt from the bearing 20 and the interior of the sleeve 21, when the sleeve 29 is off.

Having thus described my invention, what I claim is:

1. In demountable wheel constructions for cars, the combination of a journal, a sleeve rotatably mounted thereon and having a substantially cylindrical outer surface, a sleeve mounted on the first-mentioned sleeve and having a conical outer surface tapering inwardly, a wheel having a conical bore, seated on said conical surface and held against axial movement thereby in one direction and means for securing said sleeves together positively.

2. In demountable wheel constructions for cars, the combination of a journal, a sleeve rotatably mounted thereon and having an external abutment and a cylindrical outer surface, a sleeve mounted on the first-mentioned sleeve and having a conical outer surface tapering inwardly, a wheel having a conical bore seated upon said conical surface, bolts carried by said sleeves and whereby one may be moved axially upon the other and secured together with said wheel clamped between said abutment and said conical surface.

3. In demountable wheel constructions for cars, the combination of a journal having an abutment at one end and a threaded part at the other end, tapered roller bearings mounted on said journal, a sleeve mounted on said bearings, a nut on said threaded portion for securing said sleeve on said bearings and the latter on said journal, a sleeve slidably arranged on the first-mentioned sleeve and having a conical outer surface and an end wall to conceal said bearings, a wheel having a conical bore mounted on said conical surface and positively held against axial movement in one direction, and bolts for sliding the second-mentioned sleeve on the first-mentioned sleeve and for securing said wheel.

4. In demountable wheel constructions for cars, the combination of a journal having an abutment at one end and a threaded part at the other end, tapered roller bearings mounted on said journal, a sleeve mounted on said bearings and having an abutment and a cylindrical outer surface, a nut on said threaded portion for securing said sleeve on said bearings and the latter on said journal, a sleeve slidably arranged on said cylindrical surface and having a conical outer surface and an end wall to conceal said bearings, a wheel having a conical bore mounted on said conical surface and positively held thereby against said abutment, and bolts carried by said sleeves for effecting axial movement of one sleeve relative to the other.

In testimony whereof I affix my signature.

LYMAN W. CLOSE.